US011847008B2

(12) United States Patent
Hunt et al.

(10) Patent No.: US 11,847,008 B2
(45) Date of Patent: Dec. 19, 2023

(54) TECHNOLOGIES FOR PROVIDING EFFICIENT DETECTION OF IDLE POLL LOOPS

(71) Applicant: Intel Corporation, Santa Clara, CA (US)

(72) Inventors: David Hunt, Meelick (IE); Niall Power, Limerick (IE); Kevin Devey, Limerick (IE); Changzheng Wei, Shanghai (CN); Bruce Richardson, Clare (IE); Eliezer Tamir, Bait Shemesh (IL); Andrew Cunningham, Ennis (IE); Chris MacNamara, Limerick (IE); Nemanja Marjanovic, Galway (IE); Rory Sexton, Fermoy Cork (IE); John Browne, Limerick (IE)

(73) Assignee: Intel Corporation, Santa Clara, CA (US)

( * ) Notice: Subject to any disclaimer, the term of this patent is extended or adjusted under 35 U.S.C. 154(b) by 836 days.

(21) Appl. No.: 15/951,391

(22) Filed: Apr. 12, 2018

(65) Prior Publication Data

US 2019/0041957 A1 Feb. 7, 2019

(51) Int. Cl.
*G06F 1/00* (2006.01)
*G06F 1/3228* (2019.01)
(Continued)

(52) U.S. Cl.
CPC ............ *G06F 1/3228* (2013.01); *G06F 1/324* (2013.01); *G06F 1/3296* (2013.01); *G06F 15/00* (2013.01)

(58) Field of Classification Search
CPC ........ G06F 1/3228; G06F 15/00; G06F 1/324; G06F 1/3296; G06F 12/0853; Y02D 10/00
See application file for complete search history.

(56) References Cited

U.S. PATENT DOCUMENTS

| 9,319,993 B1* | 4/2016 | Urbanus | ........... H04W 52/0258 |
| 2012/0102269 A1* | 4/2012 | Ono | ..................... G06F 12/0862 711/122 |

(Continued)

OTHER PUBLICATIONS

Niels Hagoort.com, "Virtual Networking: Poll-mode vs Interrupt", Networking, Virtualization, http://https://nielshagoort.com/2017/10/13/virtual-networking-poll-mode-vs-interrupt/, Oct. 13, 2017, 11 pages.

*Primary Examiner* — Xuxing Chen
(74) *Attorney, Agent, or Firm* — Compass IP Law PC (57) ABSTRACT

Technologies for providing efficient detection of idle poll loops include a compute device. The compute device has a compute engine that includes a plurality of cores and a memory. The compute engine is to determine a ratio of unsuccessful operations to successful operations over a predefined time period of a core of the plurality cores that is assigned to continually poll, within the predefined time period, a memory address for a change in status and determine whether the determined ratio satisfies a reference ratio of unsuccessful operations to successful operations. The reference ratio is indicative of a change in the operation of the assigned core. The compute engine is further to selectively increase or decrease a power usage of the assigned core as a function of whether the determined ratio satisfies the reference ratio. Other embodiments are also described and claimed.

22 Claims, 6 Drawing Sheets

(51) Int. Cl.
*G06F 1/3296* (2019.01)
*G06F 15/00* (2006.01)
*G06F 1/324* (2019.01)

(56) References Cited

U.S. PATENT DOCUMENTS

| | | | | |
|---|---|---|---|---|
| 2012/0226866 A1* | 9/2012 | Bozek | .................... | G06F 9/4856 |
| | | | | 711/122 |
| 2013/0173885 A1* | 7/2013 | Watanabe | ............. | G06F 9/3865 |
| | | | | 712/E9.05 |
| 2013/0246708 A1* | 9/2013 | Ono | .................... | G06F 9/30185 |
| | | | | 711/122 |
| 2014/0359633 A1* | 12/2014 | Breternitz | ............. | G06F 9/5094 |
| | | | | 718/104 |
| 2019/0012486 A1* | 1/2019 | Landau | .................... | G06F 21/74 |

* cited by examiner

TECHNOLOGIES FOR PROVIDING EFFICIENT DETECTION OF IDLE POLL LOOPS

BACKGROUND

In typical packet processing applications executed by a compute device, a core of a multi-core processor may execute a poll mode driver that causes the core to continually poll a memory address (e.g., to repeatedly read descriptor data at a location in memory) waiting for a value to change, which would indicate that one or more items (e.g., packets) have been queued and are ready to be operated on (e.g., polling a queue associated with a network interface controller of the compute device for newly received packets to be operated on). The core executing the poll mode driver appears, to the operating system of the compute device, as being 100% utilized even if no change in status has occurred (e.g., no packets are being received and processed by the processor). Accordingly, as the amount of traffic (e.g., amount of incoming packets) is not indicated by the reported utilization of the core executing the poll mode driver, typical power management schemes have difficulty determining when to scale down the frequency of the core in low traffic situations or to scale up the frequency of the core in high traffic situations. As a result, an operator of the compute device (e.g., an operator of a data center that includes the compute device) may incur operating expenses for electrical power that was unnecessarily consumed due to operating the core in a relatively high power mode during an idle poll loop (e.g., in a low traffic situation) when the electrical power could have been conserved or utilized elsewhere in the data center.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
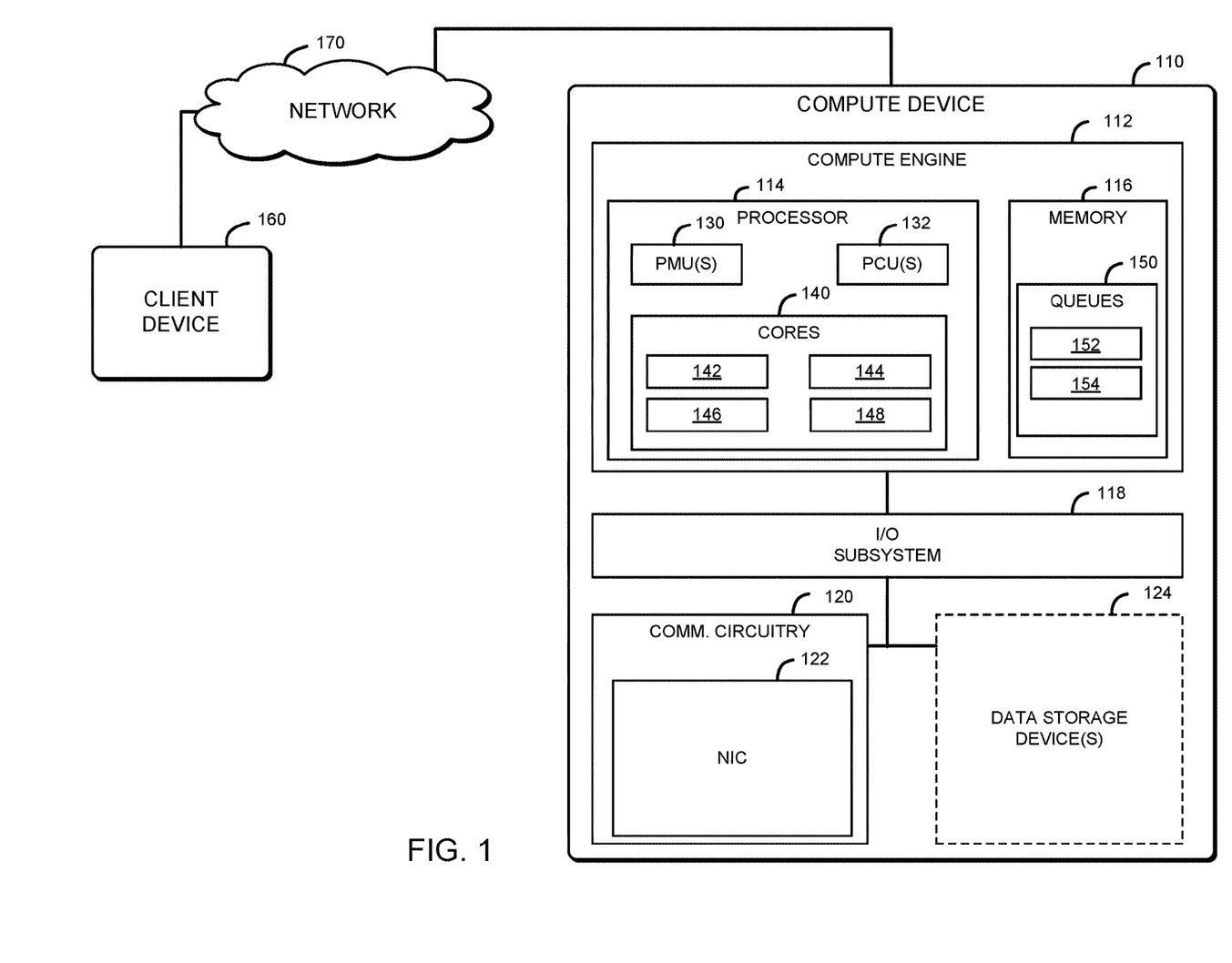
FIG. 1 is a simplified diagram of at least one embodiment of a compute device for providing efficient detection of idle poll loops.

Referring now to FIG. 1, a compute device 110 for efficiently detecting an idle poll loop is in communication with a client device 160 through a network 170. The compute device 110, in operation, may execute one or more applications (e.g., in one or more virtual machines), such as to perform services on behalf of the client device 160, using cores 140 of a processor 114. In doing so, the compute device 110 monitors, with a performance monitor unit (PMU) 130, a ratio of unsuccessful operations to successful operations (e.g., a ratio of unsuccessful to successful speculative operations such as branch misses to branch hits, cache misses to cache hits, etc.) of a core 140 that is assigned to continually poll a memory address for data indicative of a change in status (e.g., continually poll a queue 150 associated with a network interface controller (NIC) 122 for newly received packets, etc.). In response to a determination that the ratio exceeds a predefined threshold (e.g., 0.01%), the compute device determines that the core 140 has detected a change in status. Further, the compute device 110 may increase a power usage (e.g., a frequency and/or voltage) of the core 140 as a function of the amount (e.g., a linear relationship) by which the ratio exceeds the predefined threshold. Similarly, the compute device may decrease the power usage of the core as the ratio approaches the predefined threshold. In the illustrative embodiment, the compute device 110 may selectively increase or decrease the power usage of the core using a power control unit (PCU) 132. As compared to typical compute devices that determine, from a poll mode driver that constantly reports 100% utilization regardless of whether a change in status has occurred (e.g., regardless of whether any packets have been received by the NIC), the compute device 110 is able to efficiently (e.g., without dedicating hardware or software to counting the number of received packets in the NIC queue 150) and accurately determine whether a change in status has occurred, and quickly (e.g., with low latency, such as within 10 microseconds of a change in the measured ratio) scale up or scale down the power of the core 140 to conserve power and reduce the operating expenses of the compute device 110.

As shown in FIG. 1, the illustrative compute device 110 includes a compute engine 112, an input/output (I/O) subsystem 118, communication circuitry 120, and one or more data storage devices 124. Of course, in other embodiments, the compute device 110 may include other or additional components, such as those commonly found in a computer (e.g., a display, peripheral devices, etc.). Additionally, in some embodiments, one or more of the illustrative components may be incorporated in, or otherwise form a portion of, another component. The compute engine 112 may be embodied as any type of device or collection of devices capable of performing various compute functions described below. In some embodiments, the compute engine 112 may be embodied as a single device such as an integrated circuit, an embedded system, a field-programmable gate array (FPGA), a system-on-a-chip (SOC), or other integrated system or device. In the illustrative embodiment, the compute engine 112 includes or is embodied as a processor 114 and a memory 116. The processor 114 may be embodied as any type of processor capable of performing the functions described herein. For example, the processor 114 may be embodied as a multi-core processor(s), a microcontroller, or other processor or processing/controlling circuit. In some embodiments, the processor 114 may be embodied as, include, or be coupled to an FPGA, an application specific integrated circuit (ASIC), reconfigurable hardware or hardware circuitry, or other specialized hardware to facilitate performance of the functions described herein. In the illustrative embodiment, the processor 114 includes one or more performance monitor units (PMUs) 130, one or more power control units (PCUs) 132, and a corresponding set of cores 142, 144, 146, and 148 (collectively, the cores 140). Each performance monitor unit 130 may be embodied as any device or circuitry (e.g., an ASIC, a co-processor, etc.) capable of monitoring the occurrences and outcomes of micro-architectural events of the compute engine 112, such as the occurrences of speculative operations (e.g., branch predictions) and their outcomes (e.g., branch hits, branch misses), the occurrences of cache access operations and their outcomes (e.g., cache hits, cache misses), and other types of events. Each power control unit 132 may be embodied as any device or circuitry (e.g., an ASIC, a co-processor, etc.) capable of selectively increasing or decreasing a power usage of one or more components of the compute engine 112, such as one or more of the cores 140. Each of the cores 140 may be embodied as any device or circuitry capable of receiving instructions and performing calculations or actions based on those instructions. While four cores 140 are shown in the processor 114, it should be understood that in other embodiments, the number cores 140 may be different.

The main memory 116 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 116 may be integrated into the processor 114. In operation, the main memory 116 may store various software and data used during operation such as applications, programs, libraries, and drivers. In the illustrative embodiment, the memory 116 defines one or more queues 150 (e.g., queues 152, 154), each of which may be embodied as a set of memory accessible at one or more memory addresses and capable of storing data sets (e.g., packets) to be operated on by one or more of the cores 140 and/or other components of the compute device 110. For example, the queue 152 may temporarily store packets received by the NIC 122 (e.g., through the network 170 from the client device 160 or from another source) and the queue 154 may temporarily store packets to be sent by the NIC 122 (e.g., through the network 170).

The compute engine 112 is communicatively coupled to other components of the compute device 110 via the I/O subsystem 118, which may be embodied as circuitry and/or components to facilitate input/output operations with the compute engine 112 (e.g., with the processor 114 and/or the main memory 116) and other components of the compute device 110. For example, the I/O subsystem 118 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 118 may form a portion of a system-on-a-chip (SoC) and be incorporated, along with one or more of the processor 114, the main memory 116, and other components of the compute device 110, into the compute engine 112.

The communication circuitry 120 may be embodied as any communication circuit, device, or collection thereof, capable of enabling communications over the network 170 between the compute device 110 and another compute device (e.g., the client device 160, etc.). The communication circuitry 120 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 120 includes a network interface controller (NIC) 122, which may also be referred to as a host fabric interface (HFI). The NIC 122 may be embodied as one or more add-in-boards, daughter cards, network interface cards, controller chips, chipsets, or other devices that may be used by the compute device 110 to connect with another compute device (e.g., the client device 160, etc.). In some embodiments, the NIC 122 may be embodied as part of a system-on-a-chip (SoC) that includes one or more processors, or included on a multichip package that also contains one or more processors. In some embodiments, the NIC 122 may include a local processor (not shown) and/or a local memory (not shown) that are both local to the NIC 122. In such embodiments, the local processor of the NIC 122 may be capable of performing one or more of the functions of the compute engine 112 described herein. Additionally or alternatively, in such embodiments, the local memory of the NIC 122 may be integrated into one or more components of the compute device 110 at the board level, socket level, chip level, and/or other levels.

The one or more illustrative data storage devices 124 may be embodied as any type of devices configured for short-term or long-term storage of data such as, for example, memory devices and circuits, memory cards, hard disk drives, solid-state drives, or other data storage devices. Each data storage device 124 may include a system partition that stores data and firmware code for the data storage device 124. Each data storage device 124 may also include one or more operating system partitions that store data files and executables for operating systems.

The client device 160 may have components similar to those described in FIG. 1 with reference to the compute device 110. The description of those components of the compute device 110 is equally applicable to the description of components of the client device and is not repeated herein for clarity of the description. Further, it should be appreciated that any of the compute device 110 and the client device 160 may include other components, sub-components, and devices commonly found in a computing device, which are not discussed above in reference to the compute device 110 and not discussed herein for clarity of the description.

As described above, the compute device 110 and the client device 160 are illustratively in communication via the network 170, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 2:
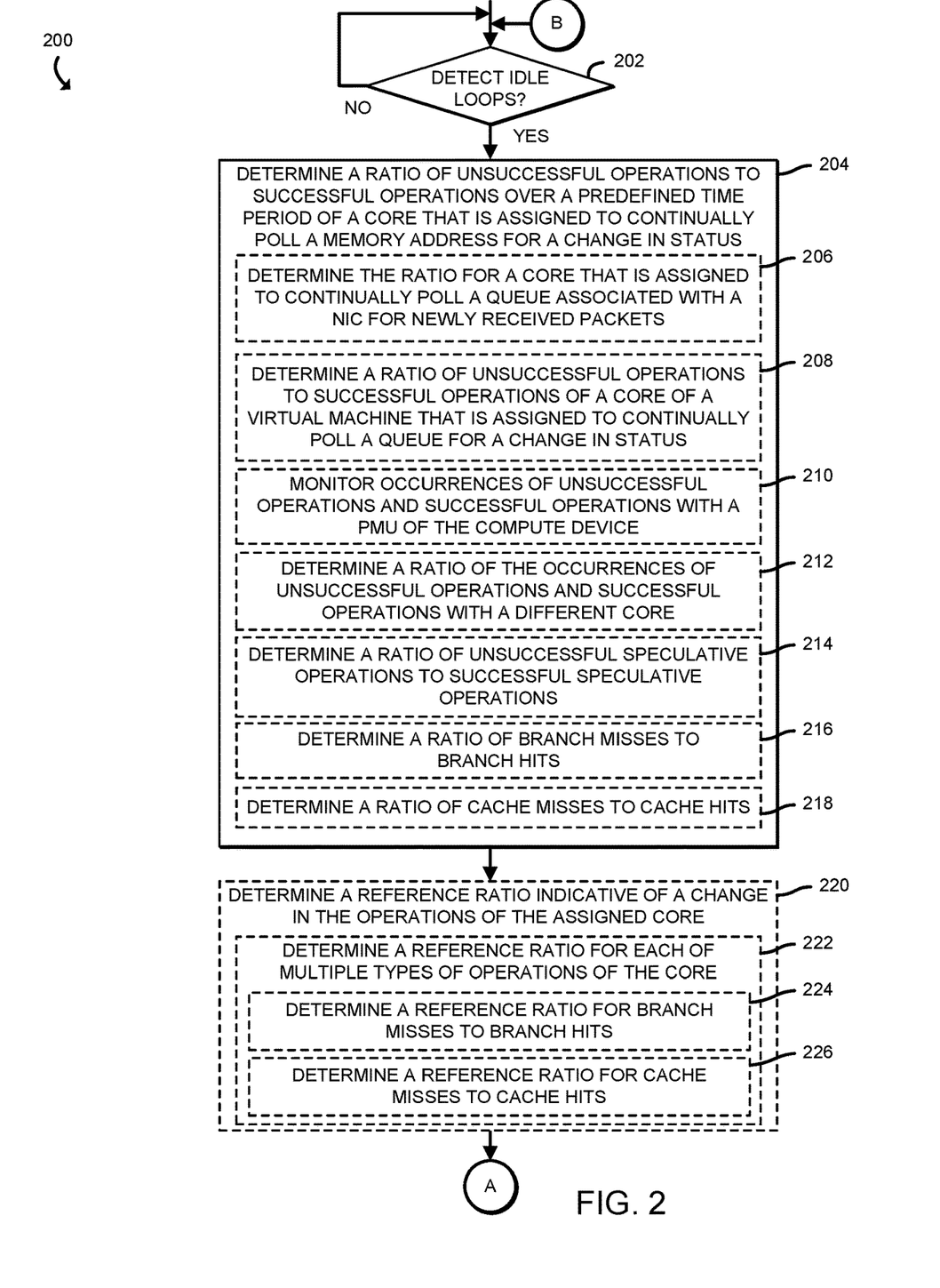
FIGS. 2-4 are a simplified block diagram of at least one embodiment of a method for efficiently detecting idle poll loops that may be performed by the compute device of FIG. 1.

Referring now to FIG. 2, the compute device 110, in operation, may execute a method 200 for efficiently detecting idle poll loops. The method 200 begins with block 202, in which the compute device 110 determines whether to detect idle poll loops. In the illustrative embodiment, the compute device 110 may determine whether a core 140 (e.g., the core 142) of the processor 114 has been assigned to continually poll a memory address for data indicative of a change in status (e.g., continually poll a queue, such as the queue 152, for a change in status, such as the presence of one or more received packets), and if so, determine to perform the method 200. In other embodiments, the compute device 110 may make the determination based on other factors. Regardless, in response to a determination to detect idle poll loops, the method 200 advances to block 204, in which the compute device 110 determines a ratio of unsuccessful operations to successful operations over a predefined time period (e.g., 10 microseconds) for a core 140 (e.g., the core 142) that is assigned to continually poll a memory address for a change in status. In doing so, and as indicated in block 206, the compute device 110, in the illustrative embodiment, determines a ratio of unsuccessful operations to successful operations of a core 140 (e.g., the core 142) that is assigned to continually poll a queue 150 (e.g., the queue 152) associated with the NIC 122 for newly received packets. In determining the ratio, the compute device 110 may determine a ratio of unsuccessful operations to successful operations of a core 140 (e.g., the core 142) utilized by a virtual machine, as indicated in block 208. As indicated in block 210, the compute device 110, in the illustrative embodiment, monitors the occurrences of unsuccessful operations to successful operations with the PMU 130. Further, and as indicated in block 212, the compute device 110 may determine the ratio (e.g., based on the occurrences monitored by the PMU 130) with a different core (e.g., the core 144) than the core 142 that is used to poll the memory address. In determining the ratio of unsuccessful operations to successful operations, the compute device 110 may determine the ratio of unsuccessful speculative operations to successful speculative operations, as indicated in block 214. For example, and as indicated in block 216, the compute device 110 may determine a ratio of branch misses (e.g., incorrectly predicting that the core 142 will perform a particular branch operation) to branch hits (e.g., correctly predicting that the core 142 will perform the branch operation). The compute device 110 may additionally or alternatively determine a ratio of cache misses to cache hits, as indicated in block 218.

Subsequently, in block 220, the compute device 110 may determine a reference ratio that is indicative of a change in the operations of the assigned core 142. For example, the compute device 110 may read, from a configuration file or another source, a predefined ratio that, if satisfied, indicates that the core 142 is no longer polling an empty queue 152 and instead has identified packets in the queue 152 and performed one or more operations on those packets. In the illustrative embodiment, the variety and complexity of the operations to be performed on the packets results in more branch mispredictions and/or cache misses as compared to when the core 142 is repeatedly polling the queue 152 and not acting upon any packets. In some embodiments, the compute device 110 may identify a determined ratio (e.g., from block 204) from a time that is known to be associated with an empty queue (e.g., a determined ratio obtained from a time when the compute device 110 had not yet begun to receive packets), increase that determined ratio by a predefined amount, and designate that adjusted determined ratio as the threshold ratio (e.g., any ratio greater than or equal to that adjusted determined ratio indicates that one or more packets have been received). In some embodiments, the compute device 110 may determine a separate reference ratio for each of multiple types of operations of the core 142, as indicated in block 222. For example, and as indicated in block 224, the compute device 110 may determine a reference ratio for branch misses to branch hits, and/or may determine a reference ratio for cache misses to cache hits, as indicated in block 226. Afterwards, the method 200 advances to block 228 of FIG. 3, in which the compute device 110 determines whether the determined ratio satisfies the reference ratio.

Figure 3:
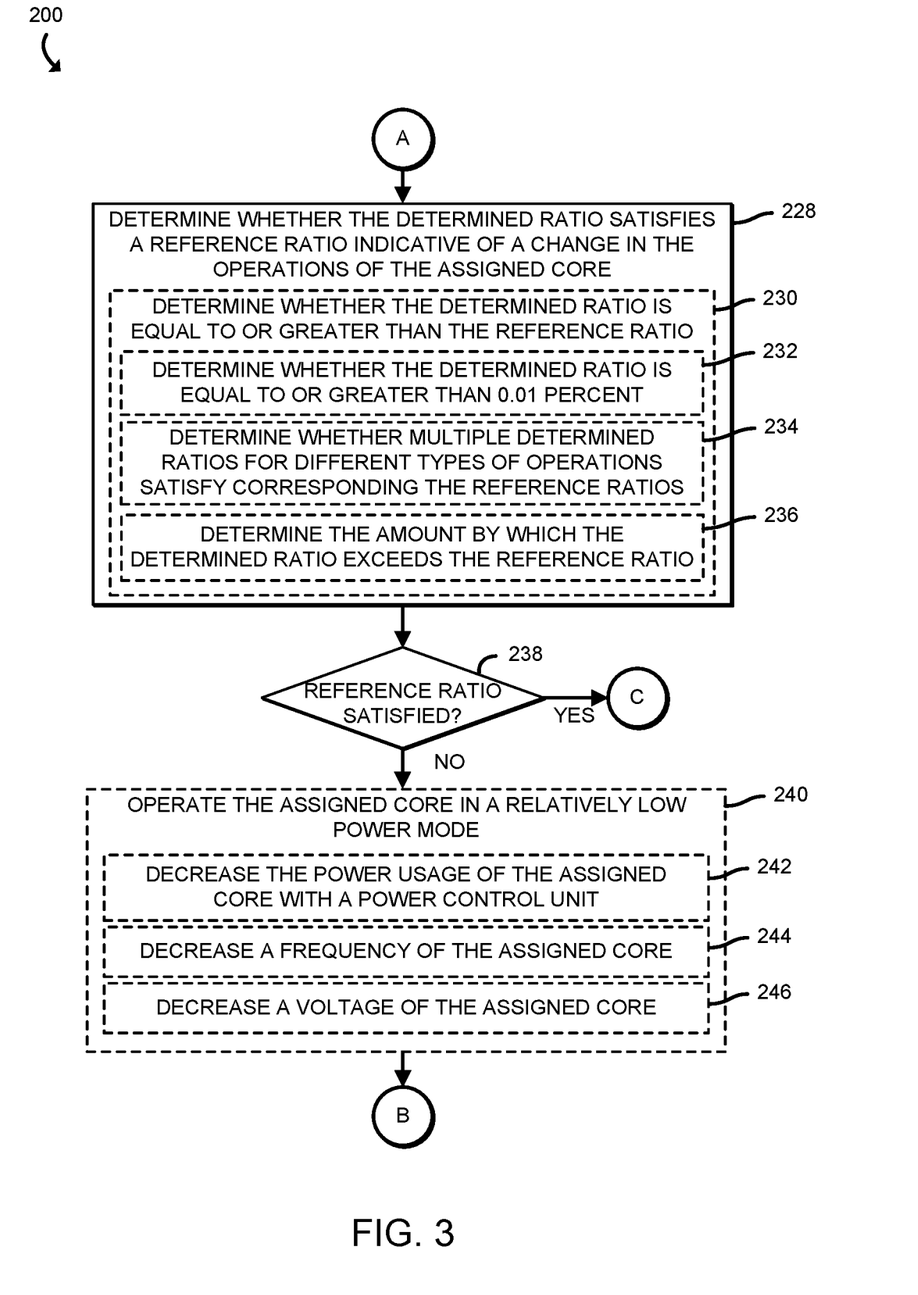

Referring now to FIG. 3, in determining whether the determined ratio (e.g., from block 204) satisfies the reference ratio, the compute device 110 may determine whether the determined ratio is equal to or greater than the reference ratio, as indicated in block 230. In doing so, and as indicated in block 232, the compute device 110 may determine whether the determined ratio is equal to or greater than 0.01 percent. In some embodiments, the compute device 110 may determine whether multiple determined ratios satisfy corresponding reference ratios (e.g., a determined ratio of branch misses to branch hits compared to a reference ratio of branch misses to branch hits, and a determined ratio of cache misses to cache hits to a reference ratio of cache misses to cache hits), as indicated in block 234. The compute device 110, in the illustrative embodiment, also determines the amount by which the determined ratio exceeds the reference ratio, as indicated in block 236. In some embodiments, the compute device 110 may provide the data indicative of the determination from block 228 to another compute device (e.g., an orchestrator server in a data center for performance monitoring and/or power management purposes). In block 238, the compute device 110 determines whether the reference ratio is satisfied (e.g., whether the determined ratio is equal to or greater than the reference ratio). The compute device 110, in some embodiments, may determine whether the determined ratio satisfies the reference ratio for a predefined time period (e.g., to provide hysteresis). In response to a determination that the reference ratio is not satisfied (e.g., that the ratio of branch misses to branch hits is less than 0.01 percent), the method 200 advances to block 240 in which the compute device 110 operates, or continues to operate, the assigned core 142 in a low power mode. In doing so, the compute device 110 may decrease, with the power control unit (PCU) 132, the power usage of the assigned core 142, as indicated in block 242. As indicated in block 244, in operating the assigned core 142 in a low power mode, the compute device 110 may decrease a frequency (e.g., a clock frequency) of the assigned core 142, as indicated in block 244 and/or decrease a voltage of the assigned core 142, as indicated in block 246. Subsequently, the method 200 loops back to block 202 of FIG. 3 in which the compute device 110 determines whether to continue to detect idle loops and again determine the ratio of unsuccessful operations to successful operations of the core 142.

Figure 4:
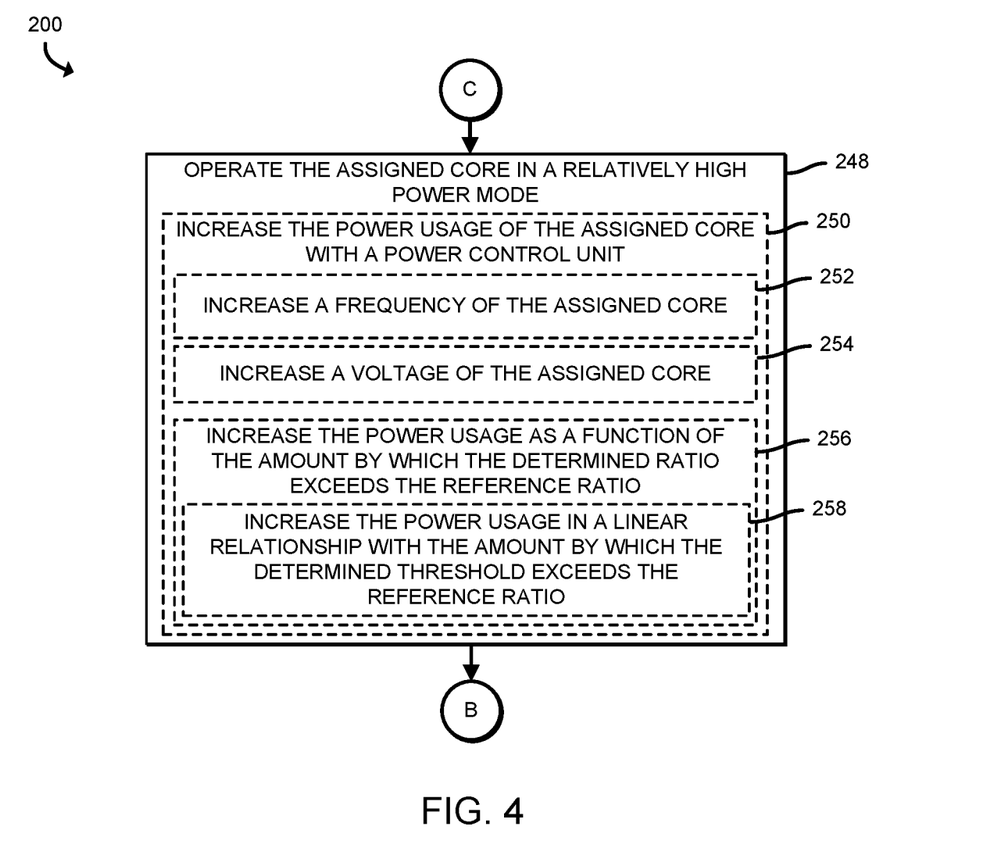

Referring back to block 238 of FIG. 3, if the compute device 110 instead determines that the reference ratio is satisfied (e.g., the determined ratio is greater than or equal to the reference ratio), the method 200 advances to block 248 of FIG. 4, in which the compute device 110 operates the assigned core 142 in a relatively high power mode (e.g., higher than the low power mode). In doing so, the compute device 110 may increase the power usage of the assigned core 142 using the power control unit (PCU) 132, as indicated in block 250. As indicated in block 252, the compute device 110 may increase a frequency of the assigned core 142. Additionally, the compute device 110 may increase a voltage of the assigned core 142, as indicated in block 254. In the illustrative embodiment, the compute device 110 increases the power usage of the core 142 as a function of the amount by which the determined ratio exceeds the reference ratio, as indicated in block 256. For example, and as indicated in block 258, the compute device 110 may increase the power usage in a linear relationship with (e.g., a linear function of) the amount by which the determined threshold exceeds (e.g., is greater than) the reference ratio. Subsequently, the method 200 loops back to block 202, in which the compute device 110 determines whether to continue to detect idle loops and again determine the ratio of unsuccessful operations to successful operations of the core 142.

Figure 5:
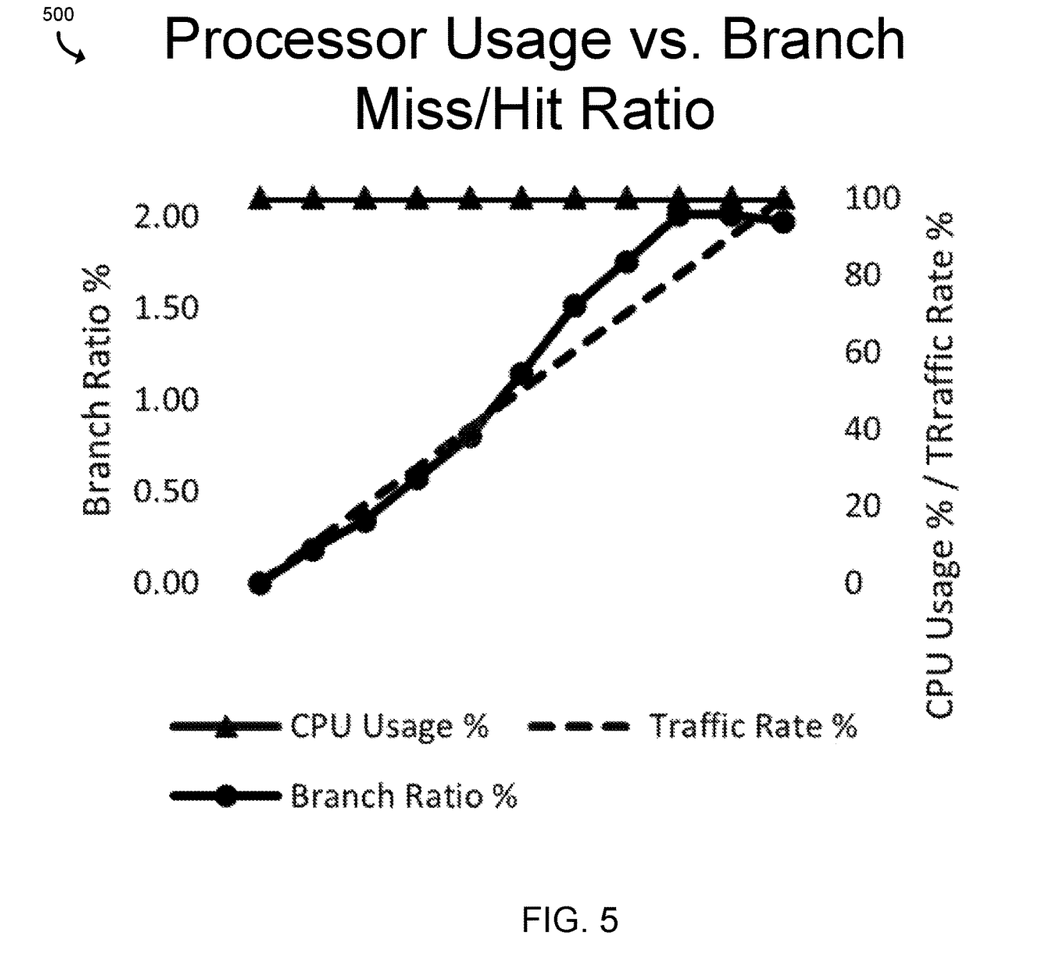
FIG. 5 is diagram of a relationship between processor usage, a branch hit and miss ratio, and a traffic rate that may exist during the operation of the compute device of FIG. 1.

Referring now to FIG. 5, a relationship 500 between processor usage, a branch hit and miss ratio, and a traffic rate (e.g., rate that packets are placed in the queue 152) is shown. In the illustrative embodiment, the processor usage appears constant at 100% (e.g., to an operating system of the compute device 110), while the actual rate of traffic varies from 0% to 100% over the same time period. However, unlike the processor usage data, the ratio of branch misses to branch hits increases as the traffic increases. As such, and as described above, by selectively adjusting the power usage of the core 142 as a function of the ratio of unsuccessful operations to successful operations of the core 142 (e.g., branch misses to branch hits), rather than controlling power as a function of the reported processor usage, the compute device 110 may accurately and efficiently determine the power needs of the core 142 and scale the power usage of the core 142 accordingly, thereby conserving power in time periods of low traffic.

Figure 6:
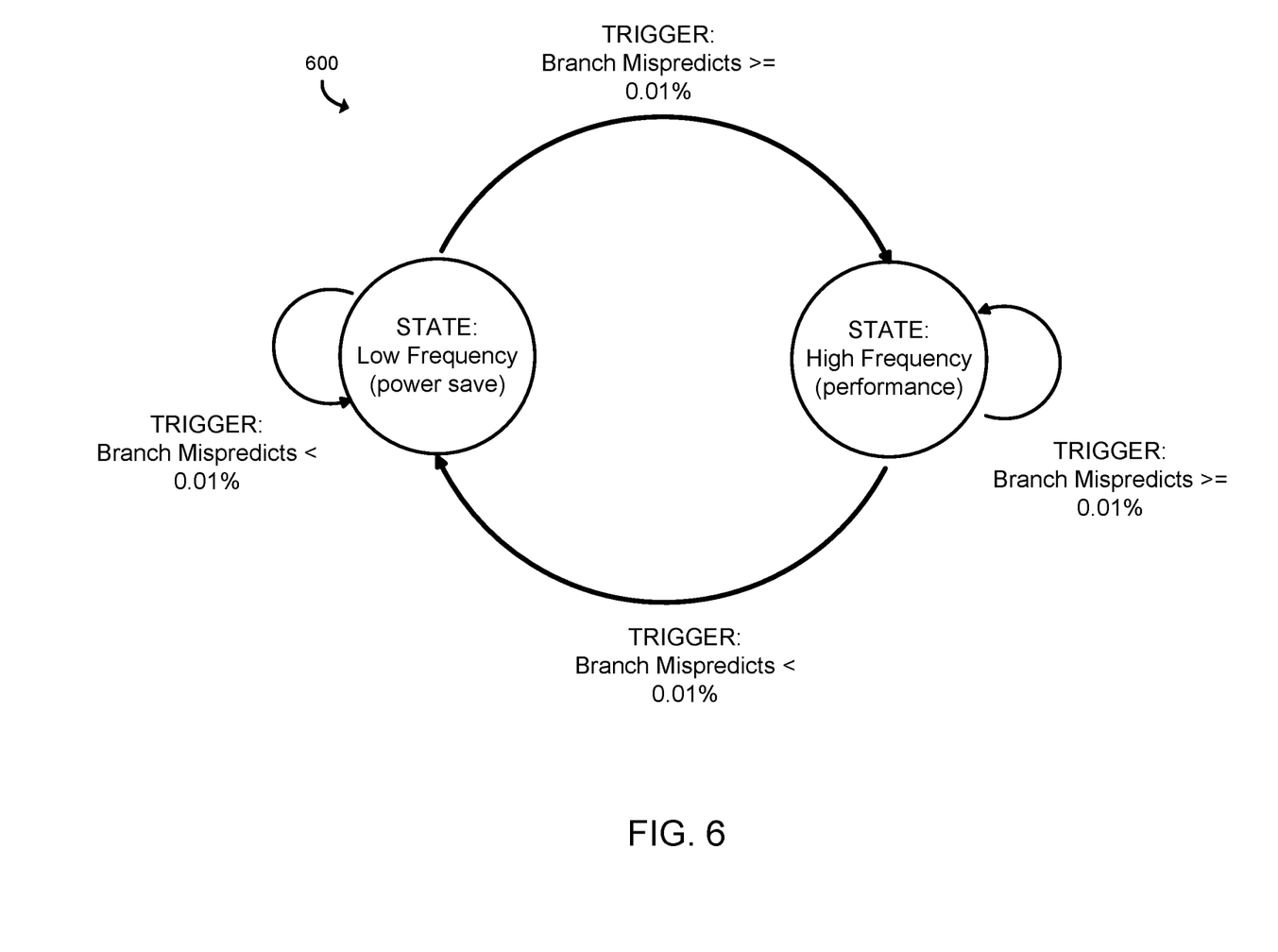
FIG. 6 is a state diagram of power usage modes that a core of the compute device of FIG. 1 may operate in during execution of the method of FIGS. 2-4.

Referring now to FIG. 6, a state diagram 600 illustrates an embodiment of the method 200. As shown, the compute device 110 operates the core 142 in a low frequency power saving state as long as the ratio of branch misses to branch hits is less than 0.01 percent. Otherwise, the compute device 110 operates the core 142 in a high frequency performance mode to improve the ability of the core 142 to operate on incoming packets (e.g., to reduce the likelihood of a buffer overflow and packet loss). While the specific examples described above pertain to detecting packets received by a NIC, it should be understood that the compute device 110 may additionally or alternatively detect and respond to changes in status for other types of queues and interfaces (e.g., data produced by a co-processor or accelerator device to be operated on by one or more cores of the processor, data received with another I/O device, other than the NIC 122, etc.).

EXAMPLES

Illustrative examples of the technologies disclosed herein are provided below. An embodiment of the technologies may include any one or more, and any combination of, the examples described below.

Example 1 includes a compute device comprising a compute engine that includes a plurality of cores and a memory; wherein the compute engine is to determine a ratio of unsuccessful operations to successful operations over a predefined time period of a core of the plurality cores, wherein the core is assigned to continually poll, within the predefined time period, a memory address for a change in status; determine whether the determined ratio satisfies a reference ratio of unsuccessful operations to successful operations, wherein the reference ratio is indicative of a change in the operation of the assigned core; and selectively increase or decrease a power usage of the assigned core as a function of whether the determined ratio satisfies the reference ratio.

Example 2 includes the subject matter of Example 1, and further including a network interface controller associated with a queue in the memory; and wherein to determine a ratio of unsuccessful operations to successful operations comprises determine a ratio of unsuccessful operations to successful operations over a predefined time period of a core of the plurality cores that is assigned to continually poll the queue for newly received packets.

Example 3 includes the subject matter of any of Examples 1 and 2, and wherein to determine the ratio of unsuccessful operations to successful operations comprises to determine the ratio of unsuccessful speculative operations to successful speculative operations.

Example 4 includes the subject matter of any of Examples 1-3, and wherein to determine the ratio of unsuccessful operations to successful operations comprises to determine the ratio of branch misses to branch hits.

Example 5 includes the subject matter of any of Examples 1-4, and wherein to determine the ratio of unsuccessful operations to successful operations comprises to determine the ratio of cache misses to cache hits.

Example 6 includes the subject matter of any of Examples 1-5, and wherein the compute engine further comprises a performance monitor unit and wherein to determine the ratio of unsuccessful operations to successful operations comprises to monitor occurrences of unsuccessful operations and successful operations with the performance monitor unit.

Example 7 includes the subject matter of any of Examples 1-6, and wherein to determine the ratio of unsuccessful operations to successful operations of the assigned core comprises to determine the ratio of unsuccessful operations to successful operations of a core utilized by a virtual machine.

Example 8 includes the subject matter of any of Examples 1-7, and wherein to determine whether the determined ratio satisfies a reference ratio of unsuccessful operations to successful operations comprises to determine an amount by which the determined ratio exceeds the reference ratio and wherein to selectively increase or decrease the power usage of the assigned core comprises to increase the power usage of the assigned core as a function of the amount by which the determined ratio exceeds the reference ratio.

Example 9 includes the subject matter of any of Examples 1-8, and wherein to increase the power usage of the assigned core as a function of the amount by which the determined ratio exceeds the reference ratio comprises to increase the power usage of the assigned core in a linear relationship with the amount by which the determined ratio exceeds the reference ratio.

Example 10 includes the subject matter of any of Examples 1-9, and wherein to determine whether the determined ratio satisfies the reference ratio comprises to determine whether the determined ratio is greater than or equal to 0.01 percent.

Example 11 includes the subject matter of any of Examples 1-10, and wherein to selectively increase or decrease the power usage of the assigned core comprises to decrease at least one of a frequency or a voltage of the assigned core.

Example 12 includes the subject matter of any of Examples 1-11, and wherein to selectively increase or decrease the power usage of the assigned core comprises to increase at least one or a frequency or a voltage of the assigned core.

Example 13 includes the subject matter of any of Examples 1-12, and wherein to determine a ratio of unsuccessful operations to successful operations over a predefined time period comprises to determine the ratio over a predefined time period of 10 microseconds.

Example 14 includes the subject matter of any of Examples 1-13, and wherein the compute engine is to determine multiple ratios of different types of unsuccessful operations to successful operations over the predefined period and compare each determined ratio to a corresponding reference ratio to determine whether to selectively increase or decrease the power usage of the assigned core.

Example 15 includes one or more machine-readable storage media comprising a plurality of instructions stored thereon that, in response to being executed, cause a compute device to determine a ratio of unsuccessful operations to successful operations over a predefined time period of a core of a plurality cores of the compute device, wherein the core is assigned to continually poll, within the predefined time period, a memory address for a change in status; determine whether the determined ratio satisfies a reference ratio of unsuccessful operations to successful operations, wherein the reference ratio is indicative of a change in the operation of the assigned core; and selectively increase or decrease a power usage of the assigned core as a function of whether the determined ratio satisfies the reference ratio.

Example 16 includes the subject matter of Example 15, and wherein to determine the ratio of unsuccessful operations to successful operations comprises to determine the ratio of unsuccessful speculative operations to successful speculative operations.

Example 17 includes the subject matter of any of Examples 15 and 16, and wherein to determine the ratio of unsuccessful operations to successful operations comprises to determine the ratio of branch misses to branch hits.

Example 18 includes the subject matter of any of Examples 15-17, and wherein to determine the ratio of unsuccessful operations to successful operations comprises to determine the ratio of cache misses to cache hits.

Example 19 includes the subject matter of any of Examples 15-18, and wherein the compute device further comprises a performance monitor unit and wherein to determine the ratio of unsuccessful operations to successful operations comprises to monitor occurrences of unsuccessful operations and successful operations with the performance monitor unit.

Example 20 includes the subject matter of any of Examples 15-19, and wherein to determine the ratio of unsuccessful operations to successful operations of the assigned core comprises to determine the ratio of unsuccessful operations to successful operations of a core utilized by a virtual machine.

Example 21 includes the subject matter of any of Examples 15-20, and wherein to determine whether the determined ratio satisfies a reference ratio of unsuccessful operations to successful operations comprises to determine an amount by which the determined ratio exceeds the reference ratio and wherein to selectively increase or decrease the power usage of the assigned core comprises to increase the power usage of the assigned core as a function of the amount by which the determined ratio exceeds the reference ratio.

Example 22 includes the subject matter of any of Examples 15-21, and wherein to increase the power usage of the assigned core as a function of the amount by which the determined ratio exceeds the reference ratio comprises to increase the power usage of the assigned core in a linear relationship with the amount by which the determined ratio exceeds the reference ratio.

Example 23 includes the subject matter of any of Examples 15-22, and wherein to determine whether the determined ratio satisfies the reference ratio comprises to determine whether the determined ratio is greater than or equal to 0.01 percent.

Example 24 includes a compute device comprising circuitry for determining a ratio of unsuccessful operations to successful operations over a predefined time period of a core of a plurality of cores of the compute device, wherein the core is assigned to continually poll, within the predefined time period, a memory address for a change in status; circuitry for determining whether the determined ratio satisfies a reference ratio of unsuccessful operations to successful operations, wherein the reference ratio is indicative of a change in the operation of the assigned core; and means for selectively increasing or decreasing a power usage of the assigned core as a function of whether the determined ratio satisfies the reference ratio.

Example 25 includes a method comprising determining, by a compute device, a ratio of unsuccessful operations to successful operations over a predefined time period of a core of the plurality cores of the compute device, wherein the core is assigned to continually poll, within the predefined time period, a memory address for a change in status; determining, by the compute device, whether the determined ratio satisfies a reference ratio of unsuccessful operations to successful operations, wherein the reference ratio is indicative of a change in the operation of the assigned core; and selectively increasing or decreasing, by the compute device, a power usage of the assigned core as a function of whether the determined ratio satisfies the reference ratio.

Example 26 includes the subject matter of Example 25, and wherein determining the ratio of unsuccessful operations to successful operations comprises determining the ratio of unsuccessful speculative operations to successful speculative operations.

Example 27 includes the subject matter of any of Examples 25 and 26, and wherein determining the ratio of unsuccessful operations to successful operations comprises determining the ratio of branch misses to branch hits.

Example 28 includes the subject matter of any of Examples 25-27, and wherein determining the ratio of unsuccessful operations to successful operations comprises determining the ratio of cache misses to cache hits.

The invention claimed is:

1. An apparatus comprising:
    circuitry, wherein during operation of a device, the circuitry is to:
    access data indicative of branch hits associated with operation of the device;
    access data indicative of branch misses associated with operation of the device; and
    set a level of power supplied to the device and a frequency of operation of the device based on the branch hits and branch misses associated with operation of the device.

2. The apparatus of claim 1, wherein the operation of the device comprises packet processing.

3. The apparatus of claim 1, wherein the operation of the device comprises execution of a virtual machine (VM) to perform packet processing.

4. The apparatus of claim 1, wherein the branch hits and branch misses are associated with branch prediction operations.

5. The apparatus of claim 1, wherein the set the level of power supplied to the device and a frequency of operation of the device is based on a ratio of branch misses to branch hits.

6. The apparatus of claim 1, comprising the device, wherein the device comprises one or more of: a core, a processor, or field-programmable gate array (FPGA).

7. The apparatus of claim 1, comprising:
    a memory and
    a network interface, wherein the network interface is to store packets into the memory and wherein the branch hits and branch misses associated with operation of the device are associated with attempts to process the packets.

8. The apparatus of claim 1, wherein the circuitry comprises a performance monitor unit (PMU).

9. One or more non-transitory machine-readable storage media comprising a plurality of instructions stored thereon that, in response to being executed, cause circuitry to:
    during operation of a device:
    access data indicative of branch hits associated with operation of the device;
    access data indicative of branch misses associated with operation of the device; and
    set a level of power supplied to the device and a frequency of operation of the device based on the branch hits and branch misses associated with operation of the device.

10. The one or more non-transitory machine-readable storage media of claim 9, wherein the operation of the device comprises packet processing.

11. The one or more non-transitory machine-readable storage media of claim 9, wherein the operation of the device comprises execution of a virtual machine (VM) to perform packet processing.

12. The one or more non-transitory machine-readable storage media of claim 9, wherein the branch hits and branch misses are associated with branch prediction operations.

13. The one or more non-transitory machine-readable storage media of claim 9, wherein the set the level of power supplied to the device and a frequency of operation of the device is based on a ratio of branch misses to branch hits.

14. The one or more non-transitory machine-readable storage media of claim 9, wherein the device comprises one or more of: a core, a processor, or field-programmable gate array (FPGA).

15. The one or more non-transitory machine-readable storage media of claim 9, wherein a network interface is to store packets into memory and wherein the branch hits and branch misses associated with operation of the device are associated with attempts to process the packets.

16. A method comprising:
    during operation of a device:
    accessing data indicative of branch hits associated with operation of the device;
    accessing data indicative of branch misses associated with operation of the device; and setting a level of power supplied to the device and a frequency of operation of the device based on the branch hits and branch misses associated with operation of the device.

17. The method of claim 16, wherein the operation of the device comprises packet processing.

18. The method of claim 16, wherein the operation of the device comprises execution of a virtual machine (VM) to perform packet processing.

19. The method of claim 16, wherein the branch hits and branch misses are associated with branch prediction operations.

20. The method of claim 16, wherein the set the level of power supplied to the device and a frequency of operation of the device is based on a ratio of branch misses to branch hits.

21. The method of claim 16, wherein the device comprises one or more of: a core, a processor, or field-programmable gate array (FPGA).

22. The method of claim 16, wherein a network interface is to store packets into memory and wherein the branch hits and branch misses associated with operation of the device are associated with attempts to process the packets.

* * * * *